Figure 1:
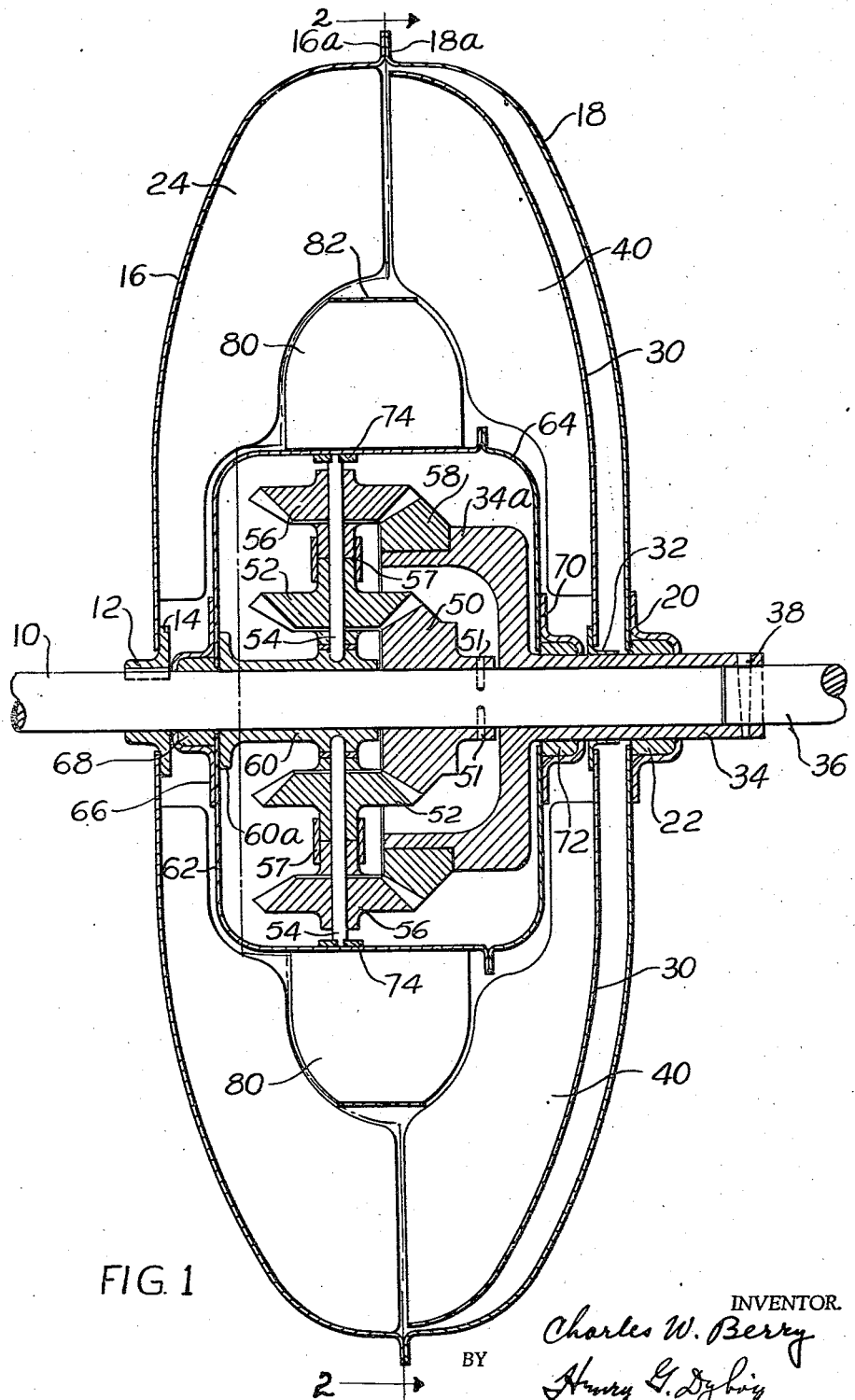

May 19, 1942.   C. W. BERRY   2,283,486
HYDRO-MECHANICAL TRANSMISSION DRIVE
Filed Sept. 12, 1940   2 Sheets-Sheet 1

INVENTOR.
Charles W. Berry
BY Henry G. Dybvig
ATTORNEY.

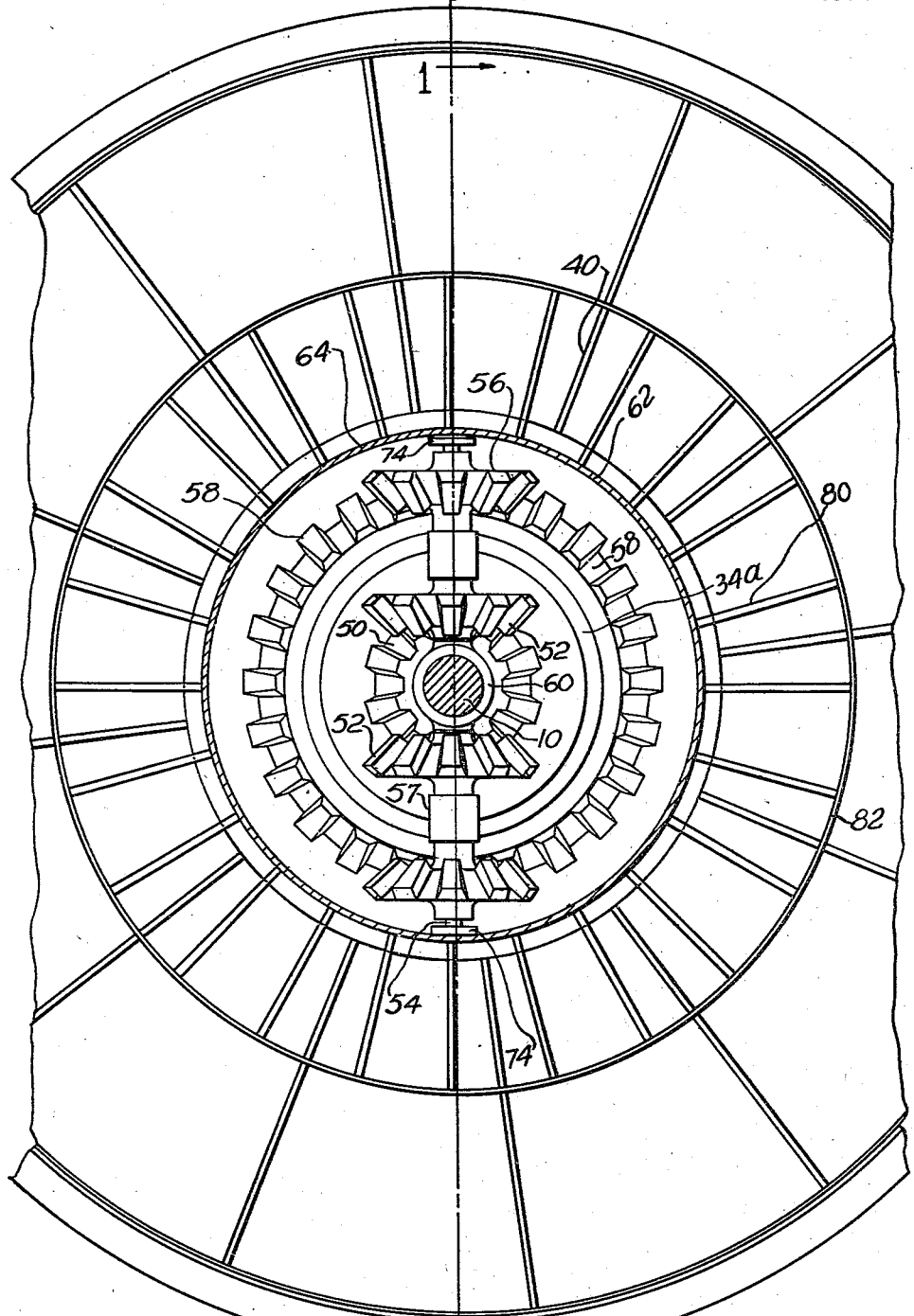

Patented May 19, 1942

2,283,486

UNITED STATES PATENT OFFICE 2,283,486

HYDROMECHANICAL TRANSMISSION DRIVE

Charles W. Berry, Dayton, Ohio

Application September 12, 1940, Serial No. 356,484

12 Claims. (Cl. 74—189.5)

This invention relates to a hydro-mechanical transmission device for transmitting power from a prime mover to a load and more particularly to a power transmission unit for changing the relative speed between the prime mover and the load in response to changing conditions.

Excepting in cases where the prime mover is connected directly to the load, it is usually necessary to provide a speed changing device, oftentimes referred to as a power transmission device, for changing the speed of the prime mover to that required by the load. In certain types of devices it is desirable to vary this speed ratio in response to changing conditions. A very good illustration of this is engine driven motor vehicles, which motor vehicles start from a standstill, the speed of the motor vehicle gradually increasing until the top speed is attained. Mechanical transmission or gear changing devices have been used. In conventional automobiles, three standard speeds have been quite generally accepted, that is, low gear, intermediate gear and high gear. More recently, some motor vehicles have utilized hydraulic transmission, so as to obtain the desired flexibility in the driving mechanism. In this type of device, a member propels a fluid to thereby transmit power to a propelled member. In this type of device the power is transmitted from the prime mover to the load exclusively by the use of a hydraulic coupling unit.

In the present invention, a combination of a hydraulic fluid drive and a mechanical drive is used, that is, the power is transmitted in part by a fluid drive and in part by a mechanical drive, the fluid drive exerting influence upon the mechanical drive. This has been accomplished by incorporating into the unit a differential drive mechanism which may have any predetermined maximum gear ratio. This differential drive may yield to the hydraulic drive under optimum driving conditions.

An object of this invention is to provide a combined hydro-mechanical transmission unit for transmitting power.

Another object of this invention is to provide a hydro-mechanical transmission unit capable of transmitting the power from the source to the load, whereby the speed of the load may differ from zero speed to the speed of the driving member.

Another object of this invention is to provide a hydro-mechanical power transmission unit, wherein an intermediary unit is driven at a speed that may differ from the input speed and from the output speed.

Another object of this invention is to provide a hydro-mechanical power transmission device, wherein the effectiveness of the mechanical transmission device increases as the differential of the speed ratios increases.

Another object is to provide a hydro-mechanical transmission device, wherein the effectiveness of the mechanical transmission device increases as the load increases.

Another object is to provide a hydro-mechanical power transmission device, wherein power is transmitted in either direction of rotation with the same effectiveness.

Another object of this invention is to provide a hydro-mechanical power transmission device, wherein the ratio of power transmitted by the hydraulic drive with respect to the power transmitted by the mechanical drive varies as the differential in speed varies.

Another object is to provide a hydro-mechanical power transmission device, wherein the ratio of the power transmitted by the mechanical drive increases relative to the power transmitted by the hydraulic drive with increased load.

Other objects and advantages reside in the construction of parts, the combination thereof and the mode of operation, as will become more apparent from the following description.

In the drawings, Figure 1 is a cross sectional view showing the gear arrangement and the hydraulic fluid arrangement of the hydro-mechanical power transmission device, taken substantially on the line 1—1 of Figure 2.

Figure 2 is a cross sectional view taken substantially on the line 2—2 of Figure 1.

This device includes broadly a hydraulic transmission device, a mechanical transmission device and means for correlating the effectiveness of the two, said means being influenced in its function both by the hydraulic transmission device and the mechanical transmission device. These will be described more fully later.

Hydraulic power transmission device

Referring to the drawings, the reference character 10 indicates a drive shaft that may be connected in any suitable manner to the prime mover, such as the engine of a motor vehicle. The shaft 10 has keyed thereto a collar 12, provided with a flange 14. This flange 14 supports a disc-like housing member 16 joined to a second housing member 18. Members 16 and 18 may be provided with peripherally disposed flange portions 16a and 18a respectively, that may be united by welding, rivets or bolts. If the parts are riveted or bolted together, a gasket is preferably inserted between the flanges 16a and 18a, so as to provide a fluid-tight joint. The housing member 18 has fixedly attached thereto a hollow boss 20 cooperating with the inner edge of housing member 18 to provide a support for a bushing 22. As the shaft 10 is driven, the housing members 16 and 18 and the parts carried thereby rotate with the shaft. The housing 16 supports a plurality of fins or fluid propelling members 24. The fins 24 are used for propelling the fluid housed within the housing, as will appear more fully later.

The housing, consisting of members 16 and 18, encloses a disc-like member 30 fixedly attached to a collar 32 carried upon a tubular sleeve 34. This tubular sleeve 34 has fixedly attached thereto a driven shaft 36 transmitting power to the load. A suitable key 38 passes through suitable apertures in the sleeve 34 and an aperture near the end of the shaft 36. The tubular sleeve 34 is journalled in the bushing or bearing 22. The disc-like member 30 supports a plurality of fin-like members 40. As the drive shaft 10 is driven from the prime mover, whatever its source may be, it drives with it the housing including members 16 and 18 and the fins 24. The housing provides a container for a suitable drive fluid, so that as the housing is rotated the fins 24 propel the fluid. The propelled fluid, as is well known to those skilled in the art, tends to go towards the periphery of the housing, due to centrifugal force. The fluid, being propelled by the fins 24, exerts a rotating force upon the fin-like members 40 carried by the disc-like member 30. By this arrangement, the shaft 10 tends to rotate the shaft 36 by the hydraulic drive that has been described thus far. A drive similar to that described thus far has actually been used in transmitting power from the prime mover to the load. As the prime mover is connected to the shaft 10 through a clutch, or any other suitable connecting means, the shaft is rotated by means of the prime mover. As the clutch usually engages the load connected thereto almost immediately after the clutch pedal is released, it can readily be seen that in the absence of a speed reducing mechanism or a hydraulic fluid drive, the releasing of the clutch pedal would throw a sudden load upon the engine and cause the load actuated by the engine to be jerked into speed. Such an arrangement, as is well known to those skilled in the art, is objectionable. The hydraulic fluid drive overcomes this objection; but the hydraulic fluid drive is conducive to a considerable slippage, especially as the load on the clutch increases. That being the case, the ideal situation would include some auxiliary device that would aid the hydraulic fluid device in transmitting the motion from the prime mover to the load.

Mechanical power transmission device

In the device disclosed herein, a transmission gear mechanism has been used to accomplish this result. This transmission drive mechanism simulates a differential drive in some respects. The differential drive mechanism includes a bevelled gear 50, keyed or otherwise fixedly attached to the shaft 10, as for example by keys 51. This gear 50 drives a bevelled pinion 52 journalled upon a shaft 54 and fixedly attached to a second bevelled pinion 56 by a retaining collar 57. The pinion 56 meshes with a gear ring member 58 fixedly attached to a cylindrical end portion 34a integral with the sleeve 34. It can readily be seen that if the shaft 54 is restrained from rotary movement about the longitudinal axis of the shaft 10, the speed of the shaft 10 then is much greater than the resultant speed of the shaft 36. If rotary movement of the shaft 54 is restrained, then by using pinions 52 and 56 that are of the same size and these rotating in unison, and a bevelled gear 50 that is substantially half the size of the gear ring 58, the speed of the shaft 10 will be approximately twice the speed of the shaft 36. There are as many shafts 54 as pairs of pinions 52 and 56. The shafts 54 and the pinions 52 and 56 are mounted for rotary movement with respect to the shaft 10. Their rotation, however, is controlled, as will appear more fully later.

Means for correlating the function of the hydraulic power transmission device with respect to the mechanical power transmission device The inner ends of the shafts 54 are fixedly attached to a tubular sleeve 60 mounted for rotation upon the shaft 10. The sleeve 60 terminates in a flange portion 60a that has fixedly attached thereto a housing member 62 cooperating with a housing member 64 to enclose the differential drive mechanism. The housing member 62 has fixedly attached thereto a boss 66 enclosing a bushing 68 journalled upon the shaft 10. The housing member 64 has fixed thereto a boss 70 enclosing a bushing 72 journalled upon the tubular sleeve portion 34. The outer ends of the shafts 54 are fixedly mounted in retaining means 74, which may be a continuous ring having a plurality of apertures, one for each of the shafts 54. The tubular sleeve 60, housing members 62 and 64, and the shaft 54 may rotate about the shaft 10 and the tubular sleeve 34, as the occasion may demand. That being the case, the differential drive mechanism is not a positive drive, in that the housing member 62 has been provided with a plurality of radially disposed paddle-like or propeller-like members 80 projecting into the fluid chamber, so that as the fluid propelled by the fins 24 is rotated or propelled, this fluid tends to propel the paddle-like members 80 and thereby rotate the housing members 62 and 64 and the parts carried thereby. The extreme outer edges of the paddle-like members 80 are attached to a ring 82, functioning to reinforce these paddle-like members 80.

When the housing members 62 and 64 and the parts carried thereby rotate in synchronism with the shaft 10, the pinions or gears 52 will not rotate about the longitudinal axis of the shaft 54 and therefore the pinions 52 will lock the transmission drive, so that the speed of rotation of the shaft 36 is the same as the speed of the shaft 10. If the load applied to the shaft 36 is such that the drive shaft 10 and the floating spider mechanism, constituting the supporting structure for the pinions 52 and 56, do not rotate in synchronism, motion is transmitted from the shaft 10 to the shaft 36 hydraulically and mechanically, as will appear more fully from the description of the mode of operation.

Mode of operation

Upon rotation of the shaft 10, the housing, including members 16 and 18 together with the fin-like members 24, rotates with the shaft. As these parts rotate, the fluid enclosed within the housing is propelled. This fluid exerts a force upon the fin-like members 40, tending to rotate the disc 30 and with it the tubular sleeve portion 34 and the shaft 36. However, there is considerable slippage, especially if the load is heavy.

In addition to the hydraulic drive, the shaft 10 rotates the gear 50, which in turn rotates the pinions 52 and 56, so as to drive the gear ring 58 unless the spider structure, supporting the pinions 52 and 56, is free to rotate. If the shaft 10 rotates in a clockwise direction, as viewed in Figure 2, the gear 50 would rotate in a clockwise direction. If the shaft 36 remains at a standstill when the shaft 10 rotates, the gear 50, meshing with the pinion 52, will cause the spider supporting the pinions 52 and 56 to rotate in a counterclockwise direction. As the spider structure rotates in a counterclockwise direction, the propeller-like members 80 are driven against the direction of flow of the hydraulic fluid as it is propelled by the fin-like members 24. The fluid tends to retard the rotation of the spider structure supporting the pinions 52 and 56 in a counterclockwise direction and exerts a pull upon this spider structure, tending to rotate the spider structure in a clockwise direction. This force exerted against the propeller-like members 80 aids the hydraulic mechanism in driving the shaft 36 in a clockwise direction, as viewed in Figure 2. When the speed ratio between the shaft 10 and the shaft 36 is two to one in the device disclosed in the drawing, the spider structure will remain at a standstill; but as it remains at a standstill, the fluid propelled by the fin-like members 24 tends to rotate the spider structure in a clockwise direction, thereby reducing the speed ratio, so that it will be less than two to one. Eventually, the entire assembly tends to rotate in unison. When this condition is attained, the shafts 10 and 36 will rotate at the same speed and the mechanical transmission device will rotate as a unit with the shaft 10. As soon as conditions change, either by an increased load or the motor is accelerated or decelerated, the drive shaft 10 and the driven shaft 36 will not continue to rotate at the same speed. As soon as the speeds of these shafts are changed, the mechanical transmission device will exert a force cooperating with the hydraulic device to attain the same speed of the shafts 10 and 36.

As the usual hydraulic fluid is not very satisfactory as a lubricant, the housing formed by members 62 and 64 is preferably filled with a suitable lubricant for the transmission device, that is, this housing is preferably filled with a suitable transmission grease or oil. As the housing is oil-tight, this lubricant will continue to remain in the housing for a long period of time.

This transmission device is primarily designed for use on automobiles, trucks and other motor vehicles; but it can easily be used wherever a variable speed ratio drive is desired. The gradual change of the ratio in speed is directly dependent upon the amount of torque required to drive the driven member and the change in speed ratio is controlled automatically within the unit itself. When the power transmission unit is used in an automobile or other motor vehicle, this unit will allow the engine to operate at all times at its peak of efficiency, irrespective of the load and the speed. This will result in increased gas mileage and less strain upon the engine and the parts driven thereby. This device is intended to replace the conventional type of multiple speed transmission used in motor vehicles and to eliminate the shifting of gears.

The same transmission device may be used to transmit power in either direction of rotation. The conventional clutch is preferably associated with this device. The clutch may be placed between the drive shaft 10 and the prime mover.

Although the disclosure shown herein incorporates the gear ratio of two to one in the mechanical transmission device, any other gear ratio may be selected to meet the required conditions. This gear ratio may depend upon the load to be pulled, the speed and other requirements of the device. The device disclosed herein has merely been shown for the purpose of illustration. Any other suitable device incorporating the same principle of operation may be used.

Part of the power is transmitted by the hydraulic device. Another part is transmitted in parallel thereto by the hydro-mechanical transmission device. The propeller-like members 80 tend to correlate the two drives, eventually resulting in the driven member rotating at the same speed as the driving member. The shape of the propeller-like members 80 and the shape of the fin-like members 24 and 40 may be altered as required by the load. The propeller-like members 80 may be made larger, so as to be more effective or they may be made smaller, so as to exert a lesser influence. If the propeller-like members 80 are made larger, more power will be transmitted by the mechanical transmission device. If they are made smaller, the power transmitted by the mechanical transmission device will be decreased. In the event the motor vehicle is descending an incline or a grade, the hydraulic device may function as a brake.

Although the preferred modification of the device has been described, it will be understood that within the purview of this invention various changes may be made in the form, details, proportion and arrangement of parts, the combination thereof and the mode of operation, which generally stated consist in a device capable of carrying out the objects set forth, as disclosed and defined in the appended claims.

Having thus described my invention, I claim:

1. A power transmission device for transmitting power from a prime mover to a load, said power transmission device including hydraulic power transmission means for transmitting power hydraulically from the prime mover directly to the load and hydro-mechanical power transmission means for transmitting power from the prime mover to the load, said hydro-mechanical power transmission means transmitting power in addition to the power transmitted by the hydraulic power transmission means, said hydro-mechanical transmission means including a floating spider having fins projecting into the fluid actuated by the hydraulic power transmission means so as to correlate the effectiveness of the hydro-mechanical transmission means with respect to the hydraulic power transmission means.

2. A hydro-mechanical power transmission device including fluid propelling means for transmitting power to the load hydraulically, and mechanical power transmitting means cooperating with the fluid propelling means for transmitting power in addition to the power transmitted hydraulically by the first mentioned means, said mechanical power transmitting means including a drive gear member and a driven gear member, a floating spider, a pair of gear pinions mounted for unison movement upon the floating spider, one of said gear pinions meshing with the drive gear member and the other meshing with the driven gear member, hollow cylindrical means interconnected to the spider, and a plurality of fluid responsive members connected to said cylindrical means, said fluid responsive members projecting so as to be influenced by the fluid propelling means.

3. A power transmission device for transmitting power from a prime mover to a load, said power transmission device including hydraulic transmission means permitting the prime mover to rotate at a speed differing from the speed of the load, and mechanical power transmission means cooperating with the hydraulic transmission means for transmitting power in addition to the power transmitted by said hydraulic transmission means, said mechanical transmission means including a gear driven by the prime mover, a second gear connected to the load, a floating spider assembly having a plurality of radially disposed pairs of gear members rotating in unison, one gear member of each pair meshing with the first mentioned gear and the other gear of each pair meshing with the second gear, hollow fluid sealing means fixedly interconnected to the spider, and a plurality of fluid propelling members projecting outwardly from said hollow fluid sealing means so as to be influenced by the fluid of the hydraulic transmission means.

4. A hydro-mechanical power transmission device including fluid propelling means for transmitting power to the load hydraulically, and mechanical power transmitting means cooperating with the fluid propelling means for transmitting power in addition to the power transmitted hydraulically by the first mentioned means, said mechanical power transmitting means including a drive gear member and a driven gear member, a floating spider, a pair of gear pinions mounted for unison movement upon the floating spider, one of said gear pinions meshing with the drive gear member and the other meshing with the driven gear member, and a plurality of fluid responsive members mounted upon the spider and projecting so as to be influenced by the fluid of the propelling means.

5. A power transmission device for transmitting power from a prime mover to a load, said power transmission device including hydraulic transmission means permitting the prime mover to rotate at a speed differing from the speed of the load, and mechanical power transmission means cooperating with the hydraulic transmission means for transmitting power in addition to the power transmitted by said hydraulic transmission means, said mechanical transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a housing enclosing said gears, and a plurality of fluid propelling members projecting outwardly from the housing so as to be influenced by the fluid of the hydraulic transmission means.

6. A power transmission device for transmitting power from a prime mover to a load, said power transmission device including hydraulic transmission means permitting the prime mover to rotate at a speed differing from the speed of the load, said hydraulic transmission means including a round housing member and a disc member mounted within the housing member, one of said members being attached for rotation with the prime mover and the other member for rotation with the load, each of said members being provided with radially disposed fin-like propelling members for actuating a hydraulic fluid, and mechanical power transmission means cooperating with the hydraulic transmission means for transmitting power from the prime mover to the load, said mechanical transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a housing enclosing said gears and a plurality of fluid propelling members projecting outwardly from the housing so as to be influenced by the fluid of the hydraulic transmission means.

7. A power transmission device for transmitting power from a prime mover to a load, said power transmission device including hydraulic transmission means permitting the prime mover to rotate at a speed differing from the speed of the load, and mechanical power transmission means cooperating with the hydraulic transmission means for transmitting power, said mechanical transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a cylindrical housing enclosing said gears, and means actuated by the hydraulic fluid projecting outwardly from said housing, said means including a plurality of propellers and a peripherally disposed ring secured to the end of the propellers for reenforcing the same.

8. A power transmission device for transmitting power from a prime mover to a load, said power transmission device including hydraulic transmission means permitting the prime mover to rotate at a speed differing from the speed of the load, said hydraulic transmission means including a round housing member and a disc member mounted within the housing member, one of said members being attached for rotation with the prime mover and the other member for rotation with the load, each of said members being provided with radially disposed fin-like propelling members for actuating a hydraulic fluid, and mechanical power transmission means cooperating with the hydraulic transmission means for transmitting power from the prime mover to the load, said mechanical transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a cylindrical housing enclosing said gears, said cylindrical housing being mounted within the round housing, and fluid propelling means projecting outwardly from the cylindrical housing, so as to be influenced by the fluid of the hydraulic transmission means, said fluid propelling means including a plurality of radially disposed propellers and a cylindrical ring fixedly attached to the ends of the propellers for reenforcing the same.

9. A power transmission device for transmitting power from a prime mover to a load, said power transmission device including hydraulic transmission means permitting the prime mover to rotate at a speed differing from the speed of the load, said hydraulic transmission means including a round housing member and a disc member mounted within the housing member, one of said members being attached for rotation with the prime mover and the other member for rotation with the load, each of said members being provided with radially disposed fin-like propelling members for actuating a hydraulic fluid, and mechanical power transmission means cooperating with the hydraulic transmission means for transmitting power from the prime moved to the load, said mechanical transmission means including a gear driven by the prime mover, a second gear connected to the load, a floating spider assembly having a plurality of radially disposed pairs of gear members rotating in unison, one gear member of each pair meshing with the first mentioned gear and the other gear member of each pair meshing with the second gear, hollow fluid sealing means fixedly interconnected to the spider, and a plurality of fluid propelling members projecting outwardly from said fluid sealing means and within the housing member so as to be influenced by the fluid of the hydraulic transmission means.

10. A power transmission device for transmiting power from a prime mover to a load, said power transmission device including hydraulic power transmission means for transmitting power hydraulically from the prime mover directly to the load and hydro-mechanical power transmission means for transmitting power from the prime mover to the load, said hydro-mechanical power transmission means transmitting power in addition to the power transmitted by the hydraulic power transmission means, said hydro-mechanical power transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a housing enclosing said gears and a plurality of fluid propelling members projecting outwardly from the housing so as to be influenced by the fluid of the hydraulic transmission means.

11. A power transmission device for transmitting power from a prime mover to a load, said power transmission device including power transmission means for transmitting power hydraulically from the prime mover directly to the load and hydro-mechanical transmission means for transmitting power in parallel with the aforementioned power transmission means, said hydro-mechanical transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a cylindrical housing enclosing said gears, and means actuated by the hydraulic fluid projecting outwardly from said housing, said means including a plurality of propellers and a peripherally disposed ring secured to the end of the propellers for reenforcing the same.

12. A power transmission device for transmitting power from a prime mover to a load, said power transmission device including a hydraulic power transmission means, said means including a round housing member and a disc member mounted within the housing member, one of said members being attached for rotation with the prime mover and the other member for rotation with the load, each of said members being provided with radially disposed fin-like propelling members for actuating a hydraulic fluid, and hydro-mechanical power transmission means for transmitting power in parallel with the aforementioned hydraulic power transmission means from the prime mover to the load, said hydro-mechanical power transmission means including a gear driven by the prime mover, a second gear connected to the load, and a floating spider assembly having a plurality of radially disposed pairs of gear members rotating in unison, one gear member of each pair meshing with the first mentioned gear and the other gear of each pair meshing with the second gear, said spider assembly including a cylindrical housing enclosing said gears, said cylindrical housing being mounted within the round housing, and fluid propelling means projecting outwardly from the cylindrical housing, so as to be influenced by the fluid of the hydraulic transmission means, said fluid propelling means including a plurality of radially disposed propellers and a cylindrical ring fixedly attached to the ends of the propellers for reenforcing the same.

CHARLES W. BERRY.